United States Patent [19]

Ando et al.

[11] Patent Number: 4,837,700
[45] Date of Patent: Jun. 6, 1989

[54] METHOD AND APPARATUS FOR PROCESSING DATA IN A GPS RECEIVING DEVICE IN A ROAD VEHICLE

[75] Inventors: Hitoshi Ando; Takashi Kashiwazaki; Masayuki Hosoi; Atsuhiko Fukushima, all of Saitama, Japan

[73] Assignee: Pioneer Electronic Corporation, Tokyo, Japan

[21] Appl. No.: 112,918

[22] Filed: Oct. 27, 1987

[51] Int. Cl.$^4$ .................. G06F 15/50; G01S 5/02
[52] U.S. Cl. .................. 364/449; 364/554; 364/575; 342/357
[58] Field of Search .............. 364/443, 449, 459, 460, 364/554, 575; 73/178 R; 342/352, 357, 358, 450–451, 457

[56] References Cited

U.S. PATENT DOCUMENTS

| | | | |
|---|---|---|---|
| 4,045,659 | 8/1977 | Akagawa et al. | 364/554 |
| 4,136,396 | 1/1979 | Hansford | 364/554 |
| 4,665,390 | 5/1987 | Kern et al. | 364/554 |
| 4,670,852 | 6/1987 | Masaki et al. | 364/575 |
| 4,672,382 | 6/1987 | Fukuhara et al. | 342/357 |
| 4,713,768 | 12/1987 | Kosaka et al. | 364/449 |
| 4,731,613 | 3/1988 | Endo et al. | 342/357 |
| 4,743,913 | 5/1988 | Takai | 342/357 |

FOREIGN PATENT DOCUMENTS 5030615 2/1983 Japan .................. 364/449

*Primary Examiner*—Gary Chin
*Attorney, Agent, or Firm*—Sughrue, Mion, Zinn, Macpeak & Seas

[57] ABSTRACT

A method for processing data received by a receiving device which outputs present location data for a movable vehicle based on the Global Positioning System and is positioned in the vehicle, including the steps of calculating an average of a predetermined number of data output from the receiving device while the vehicle stops, determining the average to be an effective data if the standard deviation of the data is within a predetermined range, and processing the averaged data as the present location data for the vehicle.

4 Claims, 5 Drawing Sheets

FIG. 6

TABLE : TYPE AND AMOUNT OF ERRORS
IN A DISTANCE DETECTION
BY A USER'S DEVICE

| | | |
|---|---|---|
| UNIVERSE PART | STABILITY OF SATELLITE'S CLOCK | 4.5 m |
| | VIBRATION OF SATELLITE | 3.0 m |
| | OTHERS | 0.5 m |
| CONTROL PART | ESTIMATE OF ORBIT OF SATELLITE | 2.5 m |
| | OTHERS | 0.5 m |
| USER'S PART | PROPAGATION DELAY IN THE IONOSPHERE | 2.3 m |
| | PROPAGATION DELAY IN THE TROPOSPHERE | 2.0 m |
| | RECEIVER NOISE | 1.5 m |
| | MULTI PASS | 1.2 m |
| | OTHERS | 0.5 m |

METHOD AND APPARATUS FOR PROCESSING DATA IN A GPS RECEIVING DEVICE IN A ROAD VEHICLE

BACKGROUND OF THE INVENTION

The present invention relates to a method and apparatus for processing data received by a GPS receiving device which outputs data indicating the location of a vehicle at present according to the Global Positioning System (hereinafter referred to as GPS).

A navigation system has been recently studied and developed for a vehicle which lends the vehicle to a predetermined destination. The system is provided with a display unit displaying map information prerecorded in a memory. The location where the vehicle is at present is pointed out on the display unit.

Such a system requires a detecting device, such as the abovedescribed GPS or the like, for detecting the place where the vehicle is at present. The detecting device receives radio waves radiated from a number of artificial satellites, at its highest accuracy, and can detect the present location of where the vehicle within 20 meters. The detecting precision of the system is influenced by the position of the artificial satellites, various perturbations of the satellites, the condition of the ionosphere, and the like. Therefore, the desired detecting precision may not be obtained by using original data from the satellites as directly received by the GPS receiving device. Further, since the location where the moving vehicle is at present changes at every moment, it is desirable for the receiving device to detect more precisely the present place of the vehicle taking into account the continuous changes in the vehicle's position.

SUMMARY OF THE INVENTION

The present invention was made in view of the aforementioned problems and requirements.

Therefore, an object of the present invention is to provide a method for processing data received by a GPS receiving device by which the present location of a vehicle can be detected more precisely by increasing the reliability of the data received by the GPS receiving device.

In the method for processing the data received by the GPS receiving device according to the present invention, while the vehicle is stopped, an average value of a predetermined number of the output data of the GPS receiving device is calculated. If the standard deviation of the data signals is in a predetermined range, the data received at that time by the GPS receiving device is determined as actual data for the place present location of vehicle.

BRIEF DESCRIPTION OF THE DRAWINGS

FIG. 6 is a table showing examples of known types and amounts of errors in the distance detection signal.

DESCRIPTION OF THE PREFERRED EMBODIMENTS

Figure 1:
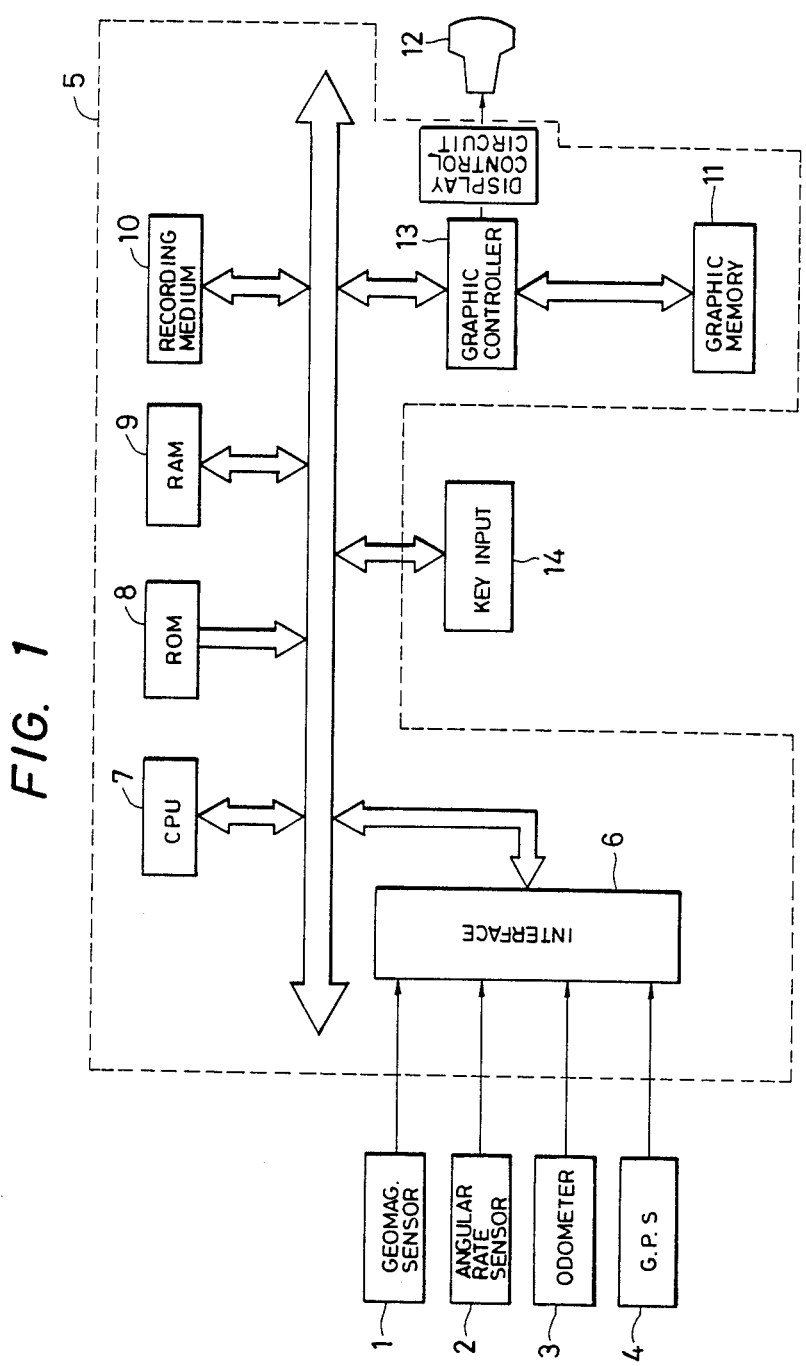
FIG. 1 is a block diagram showing a navigation system for a vehicle to which a method of the present invention can be applied.
Figure 2:
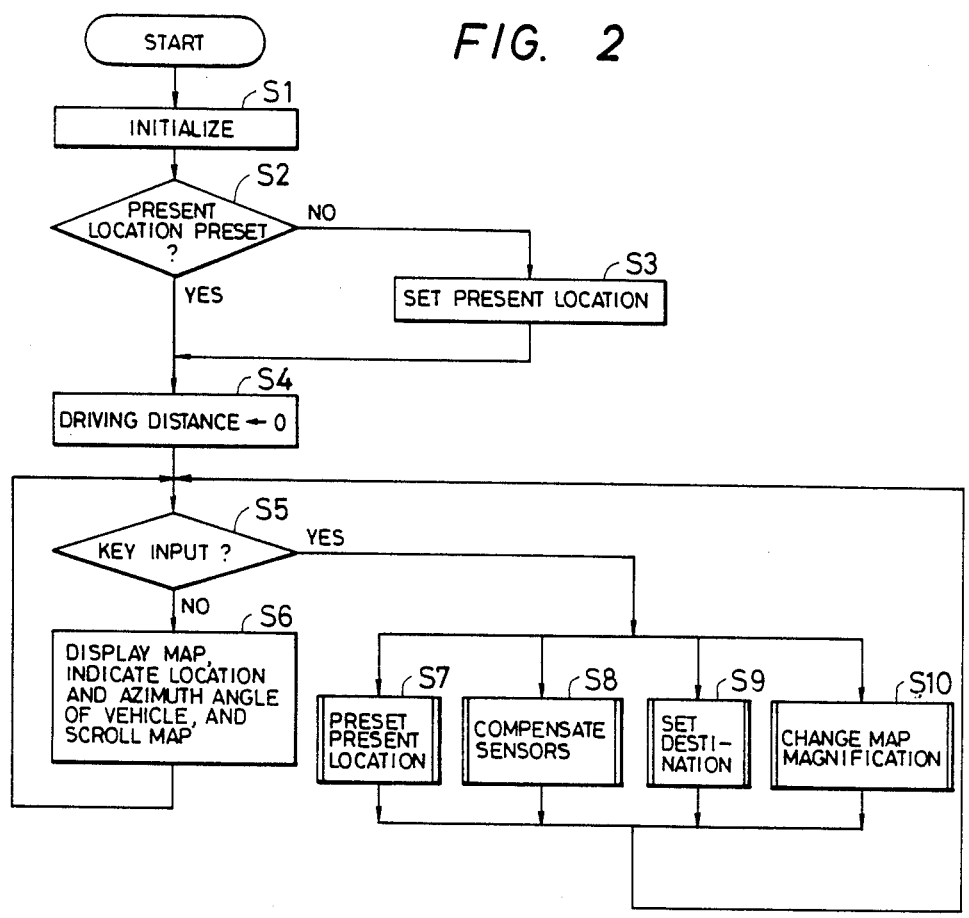
FIGS. 2 and 3 are flowcharts showing basic programs performed by a CPU shown in FIG. 1.

FIG. 1 is a block diagram showing a navigation system for a vehicle to which a method for processing data received by the GPS receiving data according to the present invention is applied. The navigation system includes a geomagnetic sensor 1 for outputting directional data of the vehicle's orientation based on the geomagnetic field of the earth. An angular rate sensor 2 detects the angular rate of change of the orientation of the vehicle. A driving distance sensor (odometer) 3 detects the distance the vehicle has moved. A GPS (Global Positioning System) receiver detects the present location of the vehicle according to the latitude and the longitude information and the like received from GPS satellites. The output signals of these sensors are applied to a system controller 5. The system controller 5 includes an interface 6, a CPU (Central Processing Unit) 7, a ROM (Read Only Memory) 8, a RAM (Random Access Memory) 9, a recording medium 10, a graphic memory 11, a graphic controller 13, and a display control circuit 15. The interface 6 digitizes the analog output signals of the sensors. The CPU 7 processes many kinds of pictorial information, and calculates, for example, the distance the vehicle has moved based on the data supplied sequentially from the sensors. Executable programs for the CPU 7 and some information necessary for the system are previously written in the ROM 8. Information necessary for executing the programs for the CPU 7 is written in and read from the RAM 9. Digitized (evaluated) map information is stored in the recording medium 10, which may, for example, be implemented with a CD-ROM (Compact Disk Read Only Memory), a semiconductor IC memory or the like. The graphic memory 11 may be a V-RAM (Video RAM), for example. The graphic controller 13 receives the graphic data such as a map and outputs it as picture information. The graphic data is stored in the graphic memory 11 by the graphic controller 13. The display control circuit 15 controls a display unit 12 such as a CRT (Cathode Ray Tube) or the like based on the graphic data outputted from the graphic controller 13. An input device 14, such as a keyboard operated by the user, supplies some types of instructions to the system controller 5.

The CPU 7 first performs an initializing step for operating the program (step S1), and then determines whether or not information of the location where the vehicle is at present has been preset (step S2). If the information is not preset, then a present location setting program is performed (step S3) by, for example, a key operation of the input device 14. Next, the driving distance is set to "0" (step S4). After that, a test is made as to whether the key input is operated or not (step S5).

If no key input operation is determined at step S5, a map of the area around the vehicle is displayed on the display unit 12, and the location where the vehicle is at present at its azimuth angle are indicated on the map with a vehicle mark or the like. When the vehicle moves, the map is scrolled correspondingly to thereby always display the location where the vehicle is at present on the display unit 12. Accordingly, if a position of the vehicle on the display unit 12 almost crosses over the edge of the area of the map data stored in the graphic memory 11, necessary additional map data is read from the recording medium 10 and displayed on the display unit 12 (step S6).

If the key input is operated, one or more steps are performed according to an instruction provided by the key input. The location where the vehicle is at present may be reset (step S7). The sensors may be compensated (step S8). The destination may be set (step S9). The map may be magnified or reduced (step S10).

Figure 3:
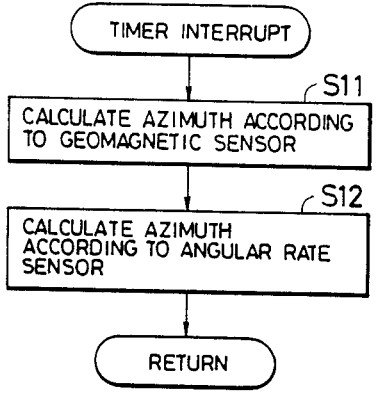

A timer interrupt operation is carried out by the CPU 7 in the manner illustrated in FIG. 3. In this operation, the azimuth of the vehicle is always calculated by the CPU in accordance with the data output of the geomagnetic sensor 1 and the angular rate sensor 2 (steps S11 and S12).

The GPS is a system for detecting the location of a vehicle at present as an absolute position on the earth according to its latitude and longitude by receiving the radio waves radiated by the artificial satellites. This system can detect the present location of the vehicle to a maximum accuracy of 20 meters. However, the actual detecting accuracy may be influenced by the positions of the artificial satellites, various perturbations of the satellites, the condition of the ionosphere, and the like.

The principle for detecting the present location of the vehicle by using the GPS system will be briefly considered.

Figure 4:
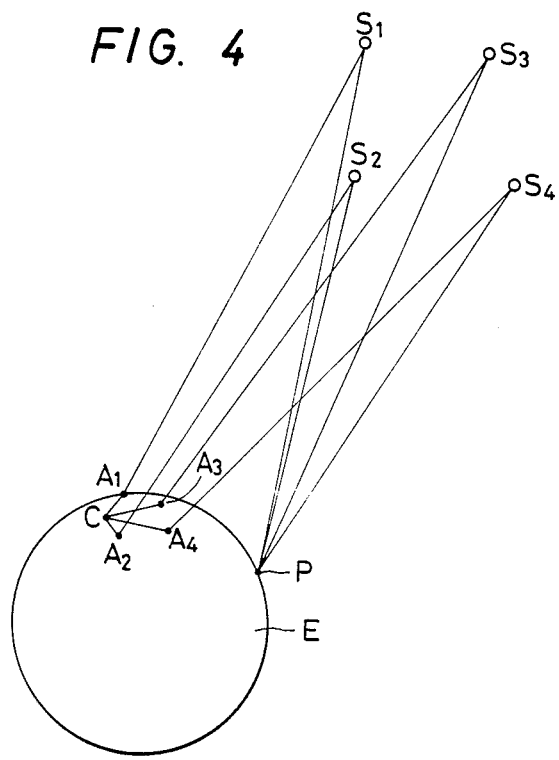
FIG. 4 is an outline sketch used to explain the principle of the GPS.

As shown in FIG. 4, the GPS includes a plurality of antennas $A_1$ to $A_4$ dispersely positioned on the earth E at predetermined intervals, a plurality of the artificial satellites $S_1$ to $S_4$, and a user P. A control center C controls the satellites $S_1$ to $S_4$ through the antennas $A_1$ to $A_4$. Each of the satellites is provided with a receiver for receiving a signal from the antennas $A_1$ to $A_4$ and a transmitter for transmitting an information signal to the user P. The user P has a receiver for receiving the information signal sent from the satellites.

Assuming a clock which is completely synchronized with a transmitting point for the radio waves and with a receiving point thereof, and also assuming the transmission signal is controlled by the clock, the propagation time from the transmitting point to the receiving point can be determined by detecting a timing relation among signals at the receiving point. Further, the distance between the transmitting point and the receiving point can be calculated by multiplying the propagation time by the velocity of light.

It is now assumed that there are three satellites $S_1$, $S_2$ and $S_3$ in the field of view of the user P. (The field of view is the range in which the user P can receive the signals from the satellites.) Each of the satellites $S_1$, $S_2$ and $S_3$ radiates a distance detection signal synchronized with the clock while the position of each of the satellites $S_1$, $S_2$ and $S_3$ receiving the signal is precisely detected. Accordingly, the distances between the place of the user P and each of the satellites $S_1$, $S_2$ and $S_3$ can be calculated by detecting each of the propagation times at the receiving point (user P). By using the propagation times, the place where the user P is at present can be precisely detected as the point of intersection of three spheres on the surface of the earth with the satellites $S_1$, $S_2$ and $S_3$ being the centers of the spheres.

However, since it is difficult to actually completely synchronze the clock at the transmitting point with the clock at the receiving point, an error in the propagation time may occur due to the delay of the signal received by the user P. Further, since the detection precision in such a system may be influenced by errors in the locations of the satellites $S_1$ to $S_4$ and by the condition of the ionosphere or the like, the distance detection signals transmitted from the satellites $S_1$ to $S_4$ to the user P may contain data of the Geometrical Dilution Of Precision (hereinafter referred to GDOP), which is an amount of error in the distance detection signal.

FIG. 6 is a table showing examples of known types and amounts of errors in the distance detection signal. The actual detecting precision of the place where a user is at present can be calculated by multiplying values shown in the table of FIG. 6 wtih the GDOP.

In order to increase the reliability of the data received by the GPS receiving device 4, in the method of processing data according to the present invention, necessary data processing is performed, when the vehicle is stopped, on the data received by the GPS receiving device 4 before the data is statistically processed.

Figure 5:
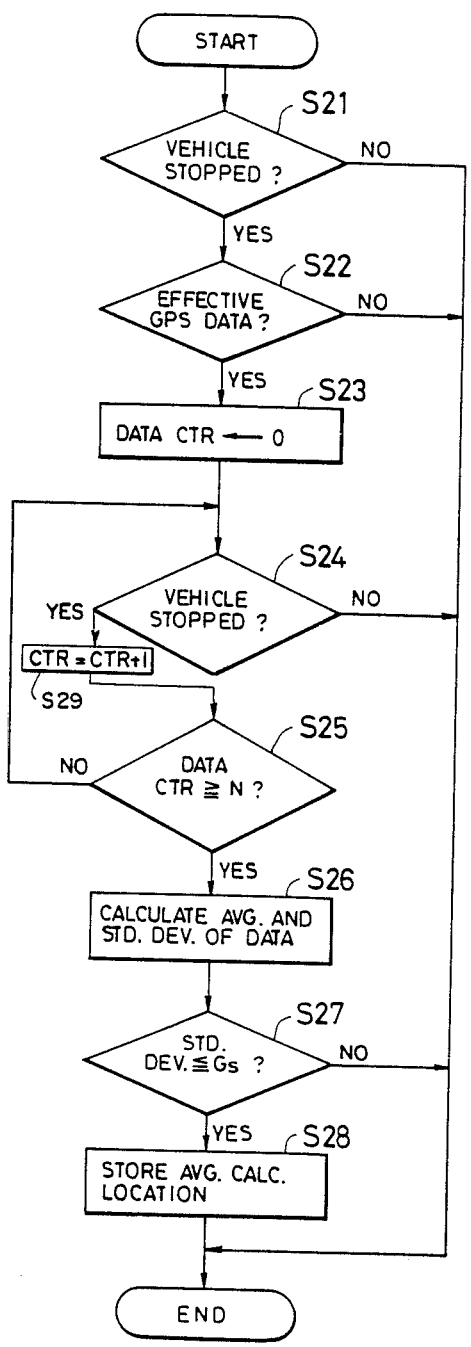
FIG. 5 is a flowchart showing a program for processing data received by the GPS receiving device according to the present invention, which is performed by the CPU shown in FIG. 1.

A program of the method for processing data received by the GPS receiving device 4 according to the present invention will be described below with reference to the flowchart of FIG. 5.

The CPU 7 first determines if the vehicle is stopped or not (step S21). The stopped condition can be determined by detecting whether the odometer 3 is changing. If the vehicle is stopped, then the CPU determines if the data outputted from the GPS receiving device 4 (hereafter referred to as GPS data) is effective or not (Step S22). (The word "effective" as used above means that the data can be used to determine the vehicle location.) The GDOP of the GPS data is used in this determination. The GDOP is a coefficient denoting an increase of the errors in the distance detecting operation, which is determined by a geometrical function between the vehicle and the satellites used for detecting the place where the vehicle is at present.

If the CPU 7 determines that the GPS data is not effective at step S22, the program ends and the GPS data is not processed any further. If the GPS data is effective, then a count value of a data counter is set to zero (step S23). Next, the CPU 7 determines if a predetermined number of the GPS data are input to the GPS receiving device while the vehicle is stopped (steps S24 and S25). The data counter is incremented for each received GPS data (step S29). Each GPS data provides a separate value for the distance detecting signal. If the predetermined number of GPS data are received, an average and the standard deviation of all the data are calculated (step S26). It is then determined if the standard deviation of the data is within a predetermined range $G_s$ or not (step S27). If the standard deviation of the data is in the predetermined range $G_s$, then the average is stored in the RAM 9 as actual data for detecting the location of the vehicle at present (step S28). In step S28, the CPU 7 processes the data for determining the location of the vehicle at present based on the map data stored in the graphic memory 11 according to standard GPS processing techniques.

In the process for determining the location of the vehicle at present, the vehicle location along a road a calculated distance from the vehicle location detected the last time the vehicle was stopped is used as the present vehicle location. Accordingly, the place where the vehicle is at present is precisely determined, although certain types of errors can occur, for example, a detecting error of the driving distance sensor 3 or a distance error caused by a digitization error of the map data. A process for determining the location of the vehicle at present has been proposed by the applicant of the present invention and is described in Unexamined Laid-Open Japanese Patent Application No. 156883/1986.

As described above in detail, according to the method of the invention, the present vehicle location data is obtained by suitably processing the GPS data while the vehicle is stopped. The actual place where the vehicle is at present can be precisely detected based on the present location data.

In the method of the present invention, an average of a predetermined number of data outputted by the GPS receiving device are calculated. The average of the data is determined as an effective data if the standard deviation of the data signals is within a predetermined range. Therefore, since the reliability of the present location data is increased, the location of the vehicle at present can be detected precisely.

What is claimed is:

1. A method for processing data received by a receiving device outputting present location data for a vehicle carrying said device based on radio waves from a plurality of satellites, said method comprising the steps of:

determining if said vehicle is stopped;

calculating an average of a predetermined number of data inputted into said receiving device while said vehicle is stopped;

determining said average as an effective data if a standard deviation of said predetermined number of data is within a predetermined range; and calculating a present location of said vehicle from said effective data.

2. The method as recited in claim 1, wherein said outputted data conforms to the Global Positioning System.

3. A device for determining a present location of a vehicle, comprising:

a receiving device mounted in a vehicle for receiving signals from a plurality of satellites as data;

means for determining if said vehicle is stopped;

means for calculating an average of a predetermined number of data received by said receiving device while said vehicle is stopped;

means for determining whether a standard deviation of said predetermined number of data is less then a predetermined value; and means for controlling said receiving device to calculate a present position of said vehicle based on said average if said standard deviation is less than said predetermined value.

4. The device as recited in claim 1, wherein said receiving device operates according to the Global Positioning System.

* * * * *